United States Patent
Suzuki et al.

(10) Patent No.: US 8,467,718 B2
(45) Date of Patent: Jun. 18, 2013

(54) COMMUNICATION SYSTEM, INFORMATION ANALYZING APPARATUS AND INFORMATION ANALYZING METHOD

(75) Inventors: Toshihiro Suzuki, Yokohama (JP); Ichiro Okajima, Yokosuka (JP); Hiroshi Kawakami, Yokosuka (JP); Manhee Jo, Yokohama (JP); Daisuke Ochi, Yokosuka (JP); Tomohiro Nagata, Tokyo (JP); Motonari Kobayashi, Yokohama (JP); Yuki Oyabu, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 82 days.

(21) Appl. No.: 13/257,821

(22) PCT Filed: Mar. 26, 2010

(86) PCT No.: PCT/JP2010/055424
§ 371 (c)(1),
(2), (4) Date: Oct. 26, 2011

(87) PCT Pub. No.: WO2010/116903
PCT Pub. Date: Oct. 14, 2010

(65) Prior Publication Data
US 2012/0040649 A1 Feb. 16, 2012

(30) Foreign Application Priority Data
Apr. 6, 2009 (JP) ............................. P2009-092225

(51) Int. Cl.
*H04H 60/66* (2008.01)
(52) U.S. Cl.
USPC ................. 455/2.01; 455/67.11; 455/405

(58) Field of Classification Search
USPC .............. 455/435.1, 2.01, 405, 423, 67.11, 455/90.1; 705/36 R
See application file for complete search history.

(56) References Cited

U.S. PATENT DOCUMENTS

| 8,224,367 B2 * | 7/2012 | Wang | 455/518 |
| 2010/0281355 A1 * | 11/2010 | White et al. | 715/222 |
| 2011/0004682 A1 * | 1/2011 | Honnold et al. | 709/224 |

FOREIGN PATENT DOCUMENTS

| JP | 2002 342557 | 11/2002 |
| JP | 2003 44969 | 2/2003 |

OTHER PUBLICATIONS

International Preliminary Report on Patentability and Written Opinion of the International Searching Authority issued Nov. 24, 2011 in patent application No. PCT/JP2010/055424 filed Mar. 26, 2010.
International Search Report Issued May 18, 2010 in PCT/JP10/055424 filed Mar. 26, 2010.

* cited by examiner

*Primary Examiner* — Marcos Torres
(74) *Attorney, Agent, or Firm* — Oblon, Spivak, McClelland, Maier & Neustadt, L.L.P.

(57) ABSTRACT

For easily and quickly collecting data regarding macroscopic population distribution, and easily and quickly obtaining the survey results, an RNC includes: a location registration signal receiver that receives location registration signals, and a signal number counting module that counts the number of the location registration signals for each sector, and an information analyzing apparatus includes: a population distribution calculation module that calculates population distribution information based on the number of the location registration signals; and an output module that outputs the population distribution information.

4 Claims, 12 Drawing Sheets

Fig.5

| SECTOR IDENTIFIER | LOCATION REGISTRATION INFORMATION IDENTIFIER | NUMBER OF SIGNALS PER SECTOR |
|---|---|---|
| 1 | 1 | 10 |
| 2 | 1 | 5 |
| 3 | 1 | 30 |
| 4 | 1 | 60 |
| 5 | 1 | 80 |
| 6 | 2 | 90 |
| 7 | 2 | 90 |
| 8 | 2 | 10 |
| 9 | 2 | 5 |
| 10 | 2 | 7 |
| 11 | 2 | 10 |
| 12 | 2 | 15 |

Fig.6
(a)
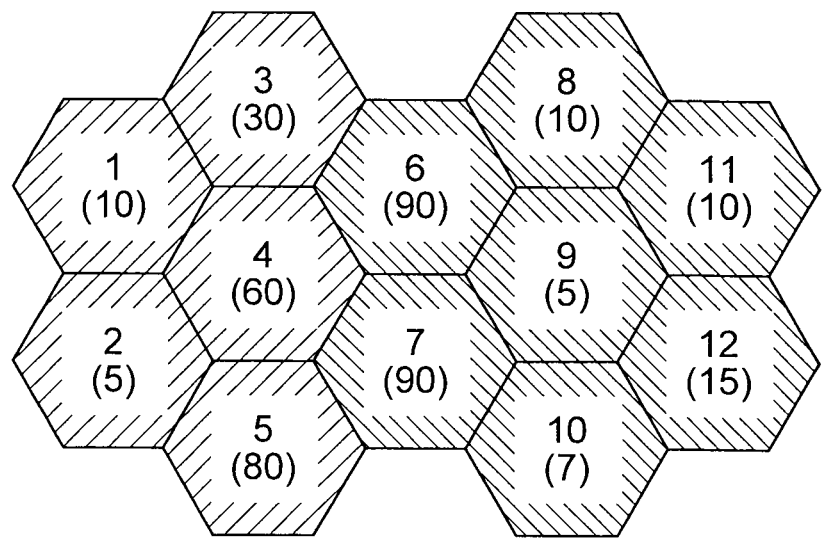
(b)
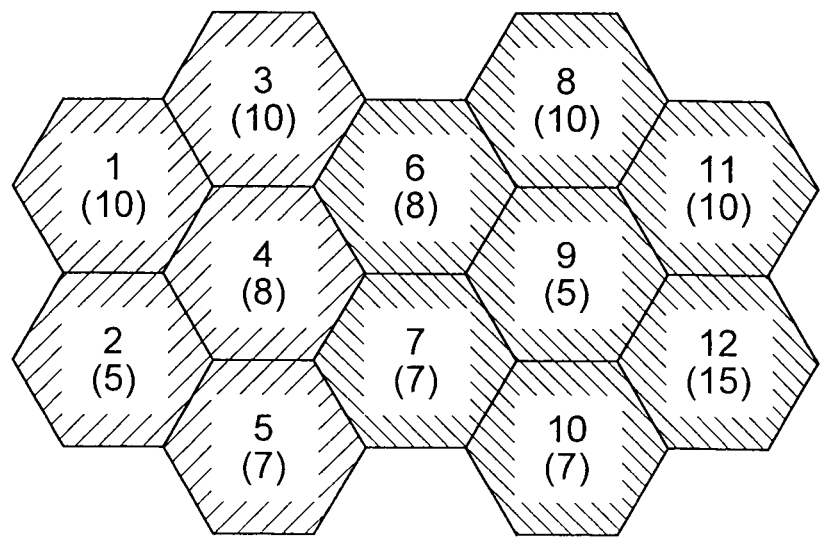

Fig.7

| LOCATION REGISTRATION AREA IDENTIFIER | SUM OF NUMBER OF SIGNALS PER SECTOR | NUMBER OF REGISTRATIONS (ACTUAL NUMBER) | WEIGHT |
|---|---|---|---|
| 1 | 40 | 50 | 1.25 |
| 2 | 81 | 70 | 0.86 |

COMMUNICATION SYSTEM, INFORMATION ANALYZING APPARATUS AND INFORMATION ANALYZING METHOD

TECHNICAL FIELD

The present invention relates to an information analyzing apparatus and an information analyzing method for performing an approximation of population distribution and a communication system that is configured to include the information analyzing apparatus.

BACKGROUND ART

Conventionally, as a method of collecting data regarding macroscopic population distribution, there is a census that is conducted on a 5-year cycle. This survey requires a series of very laborious activities such as distributing questionnaires to those surveyed, collecting them, and tallying them with many workers, whereby it takes time to obtain the survey results. On those surveyed who respond, this survey also imposes burdens such as filling out and sending the questionnaires.

CITATION LIST

Patent Literature

[Patent Literature 1] Japanese Patent Application Laid-Open Publication No. 2003-44969

SUMMARY OF INVENTION

Technical Problem

As described above, conventionally, even only collecting data regarding macroscopic population distribution is very troublesome, and thus it is difficult to collect the data easily and quickly and obtain the survey results.

On the other hand, as an attempt to obtain population distribution by using mobile terminals, in the Patent Literature 1 for example, obtaining the distribution of population by using mobile terminals with a GPS function is mentioned. However, even with this technique, in order to obtain population distribution, a processing load and time are necessary for distributing, to all users to be surveyed, GPS built-in devices to which identifiers allowing all the users to be uniquely identifiable are added, collecting location information measured by a GPS from one by one, and the like. Accordingly, a technique of easily and quickly collecting data regarding population distribution and investigating them has been expected.

The present invention, considering the above-mentioned problem, is aimed at easily and quickly collecting data regarding macroscopic population distribution, and easily and quickly obtaining the survey results.

Solution to Problem

To solve the above-mentioned problem, a communication system according to one aspect of the present invention is configured to include: a base transceiver station that controls sectors constituting a location registration area that is a unit area for registering a location; mobile stations located in the sectors; a radio network controller that controls the base transceiver station; and an information analyzing apparatus that is communicably connected with the radio network controller, wherein the radio network controller comprises: a location registration signal receiver that receives location registration signals which are transmitted from the mobile stations and are signals requesting location registration in the location registration area; and a signal number counting module that counts the number of the location registration signals for each sector, and wherein the information analyzing apparatus comprises: a population distribution calculation module that calculates population distribution information on population distribution that includes at least information corresponding to the number of the location registration signals, based on the number of the location registration signals; and an output module that outputs the population distribution information.

With this structure, by easily and quickly collecting location registration signals transmitted from mobile stations and outputting population distribution information calculated based on this information, it is possible to easily and quickly obtain data survey results regarding macroscopic population distribution.

In addition, the information analyzing apparatus may further include a boundary sector modifying module that modifies information that is included in the population distribution information and corresponds to the number of location registration signals regarding a sector located at a boundary between location registration areas.

With this structure, it is possible to appropriately correct errors in the number of location registration signals regarding sectors located at boundaries between location registration areas.

In addition, the communication system may be configured to further include an exchange including a location registration signal processing module that receives location registration signals requesting location registration in each location registration area from the mobile stations and, based on the location registration signals thus received, counts the number of location registrations that is the number of mobile stations registered in each location registration area, and the information analyzing apparatus may further include a registration number consideration module that modifies information included in the population distribution information and corresponding to the number of location registration signals for each sector constituting the location registration area, based on the number of location registrations.

For each location registration area, the information analyzing apparatus grasps the number (actual number) of mobile stations that are actually located, making it possible to calculate more realistic population distribution information by using the information grasped.

To solve the above-mentioned problem, an information analyzing apparatus according to one aspect of the present invention is communicably connected with a radio network controller that controls a base transceiver station controlling sectors in which mobile stations are located, the sectors constituting a location registration area that is a unit area for registering a location, and the information analyzing apparatus includes: a receiver that receives, from the radio network controller, the number of location registration signals per sector, the location registration signals being transmitted from the mobile stations and requesting location registration in the location registration area; a population distribution calculation module that calculates population distribution information on population distribution that includes at least information corresponding to the number of the location registration signals, based on the number of the location registration signals; and an output module that outputs the population distribution information.

With this structure, by easily and quickly collecting location registration signals transmitted from mobile stations and outputting population distribution information that is calculated based on this information, it is possible to easily and quickly obtain data survey results regarding macroscopic population distribution.

To solve the above-mentioned problem, an information analyzing method according to another aspect of the present invention is performed by a communication system configured to include: a base transceiver station that controls sectors constituting a location registration area being a unit area for registering a location; mobile stations located in the sectors; a radio network controller that controls the base transceiver station; and an information analyzing apparatus that is communicably connected with the radio network controller, and the information analyzing method includes: a location registration signal receiving step in which the radio network controller receives location registration signals which are transmitted from the mobile stations and are signals requesting location registration in the location registration area; a signal number counting step in which the radio network controller counts the number of the location registration signals for each sector; a population distribution calculating step in which the information analyzing apparatus calculates population distribution information on population distribution that includes at least information corresponding to the number of the location registration signals, based on the number of the location registration signals; and an outputting step in which the information analyzing apparatus outputs the population distribution information.

With this method, by easily and quickly collecting location registration signals transmitted from mobile stations and outputting population distribution information that is calculated based on this information, it is possible to easily and quickly obtain data survey results regarding macroscopic population distribution.

Advantageous Effects of Invention

According to the present invention, it is possible to easily and quickly (in almost real time) collect data regarding macroscopic population distribution, and to easily and quickly obtain survey results.

BRIEF DESCRIPTION OF DRAWINGS

FIG. 5 is a chart illustrating the number of signals per sector in the example for explanation.

FIG. 6 is a diagram for explaining a process by a boundary sector modifying module depicted in FIG. 2.

FIG. 7 is a chart for explaining a process by a registration number consideration module depicted in FIG. 2.

DESCRIPTION OF EMBODIMENTS

With reference to the attached drawings, embodiments of the present invention will be described. When feasible, same reference signs are given to same parts, and redundant explanations are omitted.

First Embodiment

[Structure of Communication System]

Figure 1:
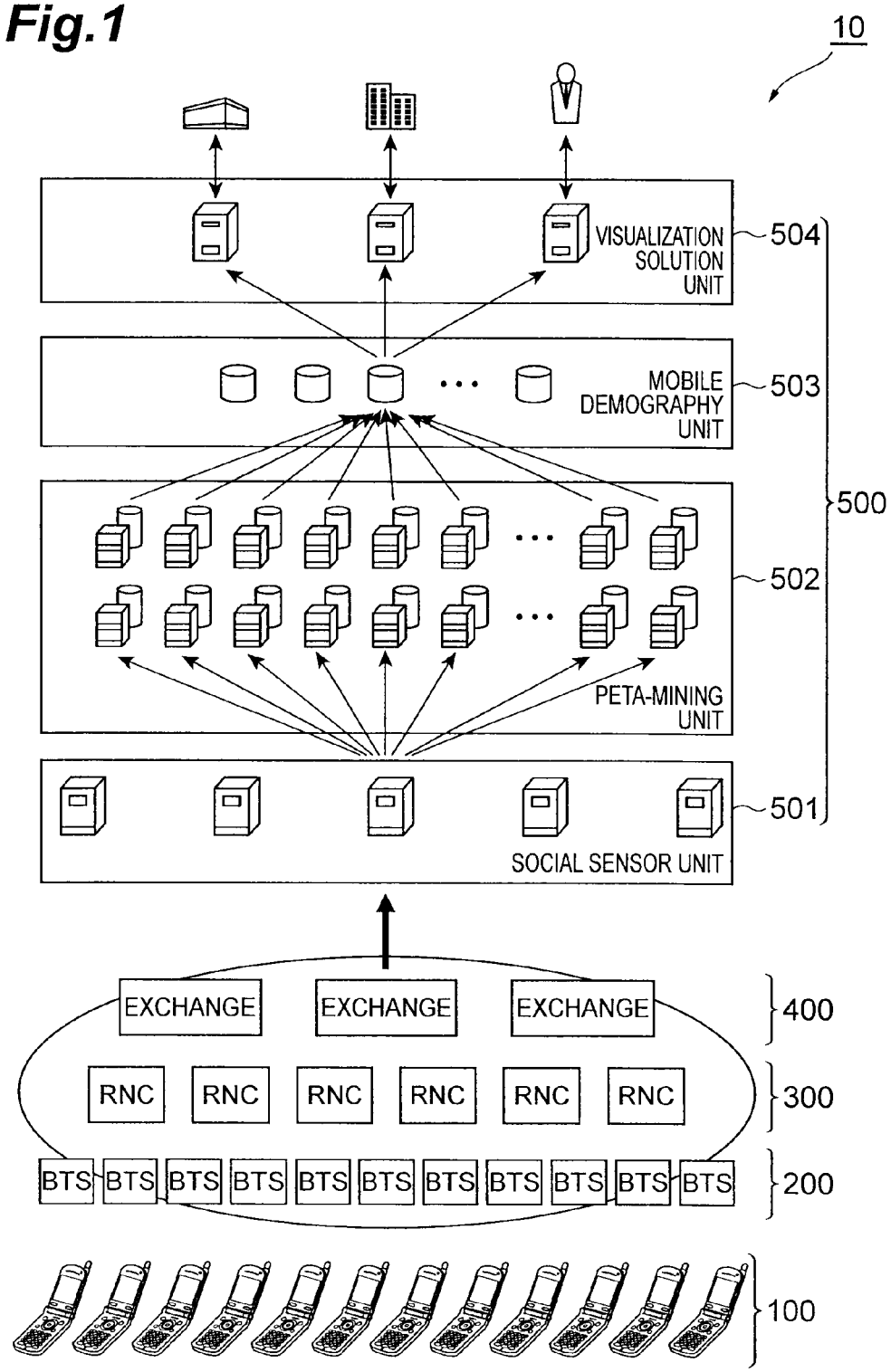
FIG. 1 is a diagram illustrating a system structure of a communication system according to a first embodiment of the present invention.

FIG. 1 is a diagram illustrating a system structure of a communication system 10 according to an embodiment of the present invention. As illustrated in FIG. 1, the communication system 10 is configured to include mobile stations 100, base transceiver stations (BTSs) 200, radio network controllers (RNCs) 300, exchanges 400, and a management center 500. The management center 500 is configured to include social sensor units 501, peta-mining units 502, mobile demography units 503, and visualization solution units 504.

The RNC 300 receives location registration signals that the mobile stations 100 transmit via the BTS 200, and counts the number of the location registration signals. It should be noted that in the standardized specification "Radio Resource Control (RRC) Protocol Specification: 3GPP TS 25.331", counting the number of location registration signals by sectors performed by the RNC 300 is specified, and thus the present method conforms to this.

Specifically, for example, it is acceptable to count the number of RRC connection request signals whose parameter "Registration" is set. Alternatively, it is acceptable to check the contents of signals at further higher level.

The exchange 400 collects, via the BTS 200 and the RNC 300, location registration signals that mobile stations 100 transmit. While the RNC 300 counts location registration signals by sectors, the exchange 400 manages the mobile stations 100 by location registration areas, and grasps and stores therein the number of mobile stations 100 registered in each location registration area by collecting location registration signals that the mobile stations transmit. The exchange 400 outputs the stored number (the number of location registrations) of the mobile stations 100 registered in each location registration area, to the management center 500 at a predetermined timing or in response to a request from the management center 500. In general, there are approximately one thousand RNCs 300 arranged all over Japan. On the other hand, there are approximately three hundred exchanges 400 arranged all over Japan.

The management center 500, as described above, is configured to include the social sensor units 501, the peta-mining units 502, the mobile demography units 503, and the visualization solution units 504 and, in each unit, statistical processes are performed using location registration signals that mobile stations 100 transmit.

The social sensor unit 501 is server equipment that collects data, stored in the exchange 400, that includes the number of mobile stations 100 registered in each location registration area, from the exchange 400. The social sensor unit 501 is configured to receive data that is outputted periodically from the exchange 400, and to obtain the data from the exchange 400 based on a timing that is predetermined in the social sensor unit 501.

The peta-mining unit 502 is server equipment that converts data received from the social sensor unit 501 into a predetermined data format. For example, the peta-mining unit 502 performs a sorting process by using user IDs as keys or by areas.

The mobile demography unit 503 is server equipment that performs a tallying process for data processed in the peta-mining unit 502, in other words, a counting process for each item. For example, the mobile demography unit 503 can count the number of users located in some area, can tally the number of users to obtain distribution of users, or the like.

The visualization solution unit 504 is server equipment that visualizes data tally-processed in the mobile demography unit 503. For example, the visualization solution unit 504 can perform a mapping of the tallied data onto a map. The data processed in the visualization solution unit 504 is provided to companies, public offices, individuals, or the like, and is used for store development, road traffic research, disaster measures, environmental measures, and the like. However, information thus statistically processed is processed so as not to violate privacy so that individuals or the like cannot be identified.

Each of the social sensor unit 501, the peta-mining unit 502, the mobile demography unit 503, and the visualizing solution unit 504 is configured with server equipment as described above, and their depictions are omitted, but it goes without saying that each of them includes basic components of a conventional information processing apparatus (i.e., a CPU, a RAM, a ROM, input devices such as a keyboard and a mouse, a communication device that communicates with the outside, a storage device that stores information therein, and output devices such as a display and a printer).

Figure 2:
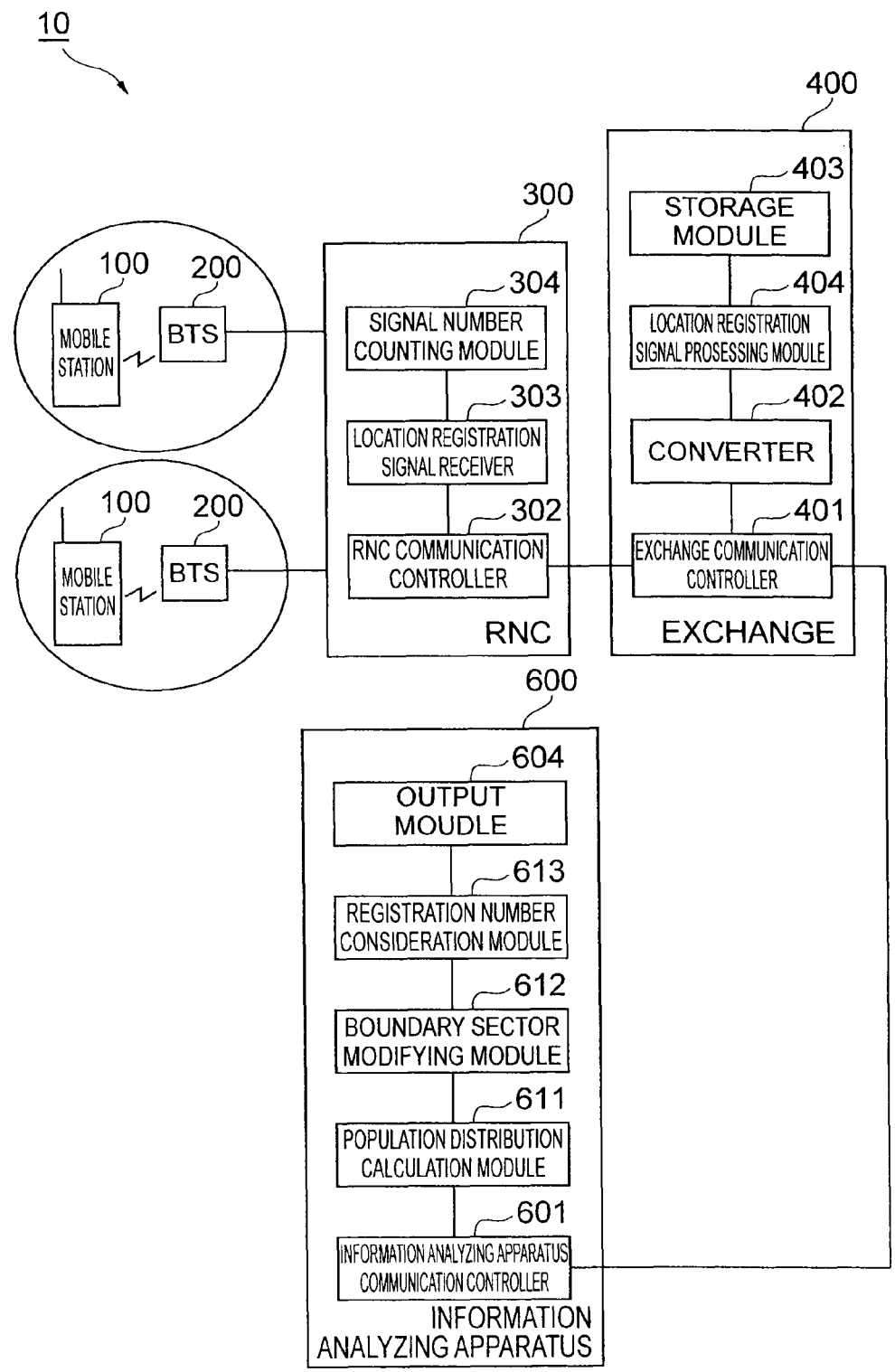
FIG. 2 is a diagram illustrating a functional structure of the communication system depicted in FIG. 1.

FIG. 2 illustrates a functional structure of the communication system 10. As illustrated in FIG. 2, the communication system 10 is configured to include: a plurality of mobile stations 100 located in sectors controlled by a plurality of BTSs 200; the RNC 300 that controls the BTSs 200; the exchange 400; and an information analyzing apparatus 600. The information analyzing apparatus 600 corresponds to the mobile demography unit 503 and the visualization solution unit 504 depicted in the above-described FIG. 1. With respect to functions corresponding to the social sensor unit 501 and the peta-mining unit 502 in FIG. 1, their depictions are omitted in FIG. 2.

The RNC 300 is configured to include an RNC communication controller 302, a location registration signal receiver 303, and a signal number counting module 304. The exchange 400 is configured to include an exchange communication controller 401, a converter 402, a location registration signal processing module 404, and a storage module 403.

The information analyzing apparatus 600 is configured to include an information analyzing apparatus communication controller 601, a population distribution calculation module 611, a boundary sector modifying module 612, a registration number consideration module 613, and an output module 604.

The RNC 300 will be described first. The RNC communication controller 302 is a component that establishes communication connection with the mobile stations 100 via the BTSs 200 and, for example, performs communication connection processing based on a transmission process from the mobile stations 100 and communication connection processing based on location registration requests. In the present embodiment, a mobile station 100, (1) when the mobile station 100 moves across a boundary of location registration areas that are unit areas in requesting registration of a location, and (2) at every constant period (for example, 54 minutes), transmits a location registration signal that is a signal requesting location registration in a location registration area. Furthermore, in the present embodiment, the RNC communication controller 302 can transmit an Initial UE Message used for communication connection processing, to the exchange 400. This Initial UE Message includes instruction information (a location registration signal) indicating a transmission or a location registration request, and an ID such as a temporary ID that uniquely specifies the mobile station 100. Furthermore, location information of the mobile station 100 can be added to the Initial UE Message. The temporary ID is ID information delivered by the exchange 400 when the mobile station 100 connects with a network.

Figure 3:
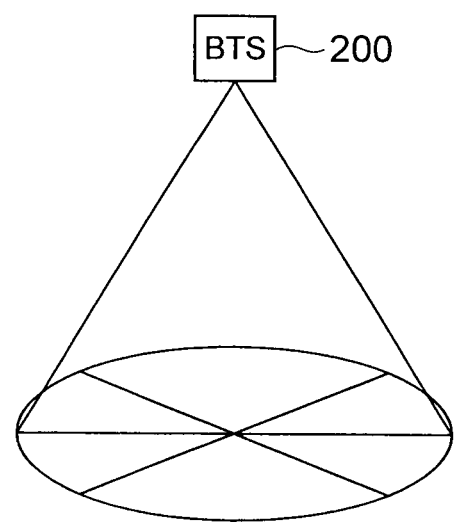
FIG. 3 is a diagram illustrating a relationship between a BTS depicted in FIG. 2 and sectors.

FIG. 3 is a diagram illustrating a relationship between a BTS 200 and sectors. The BTS 200 lies in the center of an area depicted by a circle, and a plurality of pieces into which the area is equally divided by the BTS 200 as a center are sectors. For example, in FIG. 3, a communication area of the BTS 200 consists of at most six sectors and, to each of the sectors, a sector identifier (sector ID) that can uniquely identify a sector is allocated. The RNC 300 can grasp in which sector a mobile station 100 is located by using the sector identifier via the BTS 200.

The RNC 300, based on delays of signals obtained when performing a process of RRC connection request, can calculate in which location in a sector a mobile station 100 is located, and a geographical area ID (GAI) of the calculated location. It is also possible to identify a location of the mobile station 100 based on the sector ID and the location in the sector.

The location registration signal receiver 303 is a component that receives, via the RNC communication controller 302, location registration signals that a mobile station 100 transmits.

The signal number counting module 304 is a component that counts, based on the location registration signals that the location registration signal receiver 303, receives the number of location registration signals per sector ("the number of signals per sector" used hereinafter: i.e., the number of location registration signals that mobile stations 100 transmit during a unit time in the corresponding sector) that is a sum of counts of location registration signals generated for each sector by the above-mentioned method.

The signal number counting module 304 transmits the number of signals per sector to the exchange 400 via the RNC communication controller 302.

The exchange 400 will be described hereinafter. The exchange communication controller 401 is a component that receives an Initial UE Message transmitted from the RNC 300 and performs communication connection processing using this Initial UE Message.

The converter 402 is a component that converts an ID such as a temporary ID included in the Initial UE Message received by the exchange communication controller 401, into a telephone number. The converter 402, in a converting process, extracts a telephone number related to an ID such as a temporary ID from a subscriber profile information storage module (not depicted) storing subscriber profile information therein to convert the ID into the telephone number thus extracted. This subscriber profile information storage module is provided to a home location register (HLR) not depicted, for example, and manages and stores therein IDs such as temporary IDs in association with telephone numbers.

The location registration signal processing module 404 is a component that receives location registration signals from mobile stations 100 via BTSs 200 and counts the number of location registrations that is the number of mobile stations 100 registered in a location registration area, based on the location registration signals thus received.

As described above, in the present embodiment, a mobile station 100 transmits a location registration signal when the mobile station 100 moves across a boundary of location registration areas. For this reason, the location registration signal processing module 404 is capable of grasping the actual number of mobile stations 100 located in each location registration area. In the standardized specification "Mobile Application Part (MAP) specification: 3GPP TS 29.002", a method by which an exchange 400 manages location registration is described. A process by the exchange 400 of the present embodiment conforms to this method.

The storage module 403 is a component that inputs and stores therein the number of location registrations that the location registration processing module 404 counts and the number of signals per sector received from the RNC 300 via the exchange communication controller 401. The storage module 403 can store therein telephone numbers converted by the converter 402, location information of mobile stations 100 included in an Initial UE Message, and the time when the location information is measured, in association with one another. The number of location registrations stored in the storage module 403, in accordance with a transmission process performed by the exchange communication controller 401, is collected at a predetermined timing described later or in response to a request from the management center 500.

The exchange communication controller 401 transmits, to the information analyzing apparatus 600, information such as the number of location registrations that the storage module 403 stores therein.

The information analyzing apparatus 600 will be described hereinafter. The information analyzing apparatus communication controller 601 is a component that controls communication between the information analyzing apparatus 600 and the exchange 400.

The population distribution calculation module 611 is a component that receives the number of signals per sector that the signal number counting module 304 of the RNC 300 counts, via the information analyzing apparatus communication controller 601, and calculates population distribution information on population distribution that includes at least information corresponding to the number of signals per sector, based on the number of signals per sector. In the present embodiment, as an example of population distribution information, information is used, in which the number of signals per sector and a registration area identifier to which the corresponding sector belongs are related to a sector identifier and also in which location relationships between sectors (in other words, adjacency relationships of sectors) are included.

Figure 4:
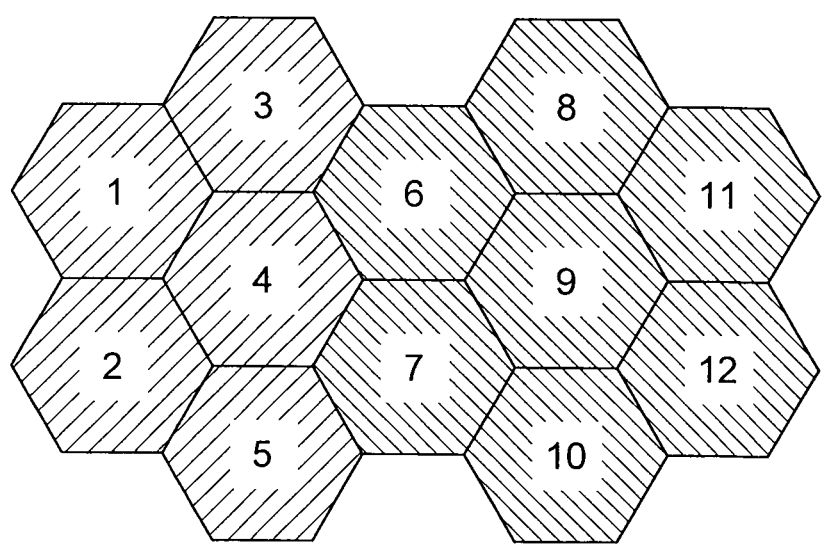
FIG. 4 is a diagram illustrating shapes of sectors and sector identifiers used in an example for explanation.

In FIG. 4 and FIG. 5, examples of the number of signals per sector used for explaining the present invention are illustrated.

In FIG. 4, one area depicted by a hexagon corresponds to one sector. Numbers written in the centers of the hexagons indicate sector identifiers that make sectors uniquely identifiable. Sectors whose sector identifiers are 1 to 5 in FIG. 4 belong to the same location registration area. Sectors whose sector identifiers are 6 to 12 belong to the same (i.e. different from the location registration area to which the sector identifiers 1 to 5 belong) location registration area.

FIG. 5 illustrates an example of the number of signals per sector in the sectors depicted in FIG. 4.

The boundary sector modifying module 612 is a component that, out of information included in population distribution information, modifies information corresponding to the number of signals per sector regarding sectors lying at a boundary between location registration areas. As described above, in the present embodiment, a mobile station 100, (1) when the mobile station 100 moves across a boundary of location registration areas, and (2) when a certain period has passed (for example, 54 minutes), transmits a location registration signal.

As depicted in the example of FIG. 5, in sectors lying at a boundary between location registration areas (in the example of FIG. 5, sectors whose sector identifiers are 3 to 7), because location registration signals generate in the case of the above-mentioned (1) when the mobile station 100 moves across a boundary of location registration areas, the number of signals per sector tends to become relatively larger. Even when there is no movement, location registration signals are generated due to radio field intensity in boundary sectors, and thus the number of signals per sector may become larger.

A method of modifying such an error will be described referring to FIG. 6. Numbers written in the centers of hexagons illustrated in FIG. 6(a), FIG. 6(b) are sector identifiers. Numbers written in parentheses under the sector identifiers in FIG. 6(a), FIG. 6(b) are the number of signals per sector. FIG. 6(a) is a diagram illustrating those before modification by the boundary sector modifying module 612. FIG. 6(b) is a diagram illustrating those after modification by the boundary sector modifying module 612.

For sectors whose sector identifiers are 1, 2, and 8 to 12 in FIG. 6(a), the boundary sector modifying module 612 does not perform modification.

For a sector whose sector identifier is 3 (hereinafter, a sector whose sector identifier is x is referred to as a "sector x"), because it lies at a boundary between location registration areas, the boundary sector modifying module 612 performs modification. In other words, the boundary sector modifying module 612 replaces the number of signals per sector regarding a sector 3 included in population distribution information with the number of signals per sector "10" of a sector 1 that is most reliable among sectors adjacent to the sector 3. The boundary sector modifying module 612, if it is a reliable sector, not only sectors in the same location registration area, but also sectors in the adjacent location registration area are considered. However, considering sectors in the adjacent location registration area is not indispensable, and it is acceptable to consider only sectors in the same location registration area.

The boundary sector modifying module 612 sets a flag (reliable value flag) for the sector 3.

A sector 4 will be described below. In the case of the sector 4, reliable sectors among adjacent sectors are selected and, in this case, the sectors 1 and 2 (do not lie at the boundary between the location registration areas) and the sector 3 (for which a reliable value flag is set) are selected. Because a plurality of sectors are selected, the average of the number of signals per sector of the respective sectors 1 to 3 is defined as the number of signals per sector of the sector 4. In other words, the number of signals per sector of the sector 4 after modification can be obtained from the expression "(10+10+5)/3".

The boundary sector modifying module 612 sets a flag (reliable value flag) for the sector 4. Furthermore, modification is performed similarly for the sectors 5 to 7.

Population distribution information after modification by the boundary sector modifying module 612 is illustrated in FIG. 6(b). FIG. 6(b) herein uses integer values rounded off to the nearest one as the numbers of signals, but this is just an example of calculation, and it is not limited to this. For example, fractional values may be used for the numbers of signals.

By this method, it is possible to correct errors in the numbers of signals per sector regarding sectors lying at a boundary between location registration areas by a reliable method based on reliable numbers among the numbers of signals per sector regarding adjacent sectors.

The registration consideration module 613 is a component that modifies, out of information included in population distribution information, information corresponding to the number of signals per sector based on the number of location registrations that is the number of mobile stations 100 registered in a location registration area.

Figure 8:
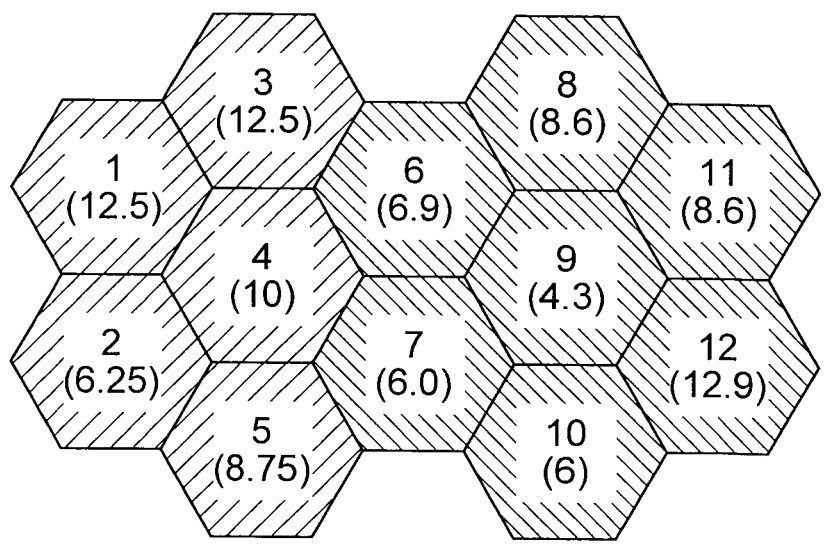
FIG. 8 is a diagram illustrating an example of population distribution information outputted by the registration number consideration module depicted in FIG. 2.

Referring to FIG. 7 and FIG. 8, a method by which the registration number consideration module 613 modifies, out of information included in population distribution information, information corresponding to the number of signals per sector based on the number of location registrations.

FIG. 7 is a chart illustrating a relationship, by location registration areas, between the sum of the number of signals per sector regarding all sectors constituting the location registration areas and the actual number of mobile stations 100 registered in the location registration areas.

The registration number consideration module 613 calculates a "weight" in FIG. 7 by dividing "the number of location registrations (the actual number)" by "the sum of the number of signals per sector". As described above, in the present embodiment, the exchange 400 grasps the actual number (i.e., the number of location registrations) of mobile stations 100 registered in a location registration area at a given time. The registration number consideration module 613 inputs the number of location registrations that the storage module 403 of the exchange 400 stores therein, and defines it as "the number of location registration (actual number)" in FIG. 7.

The registration number consideration module 613 multiplies the number of signals per sector regarding all sectors constituting the corresponding location registration area by the "weight". Accordingly, with respect to sectors constituting the same location registration area, it is possible to obtain more realistic population distribution information without changing ratios between the numbers of signals per sector.

FIG. 8 illustrates an example of population distribution information after being modified by the registration number consideration module 613.

The output module 604 is a component that outputs population distribution information that the population distribution calculation module 611 calculates and is modified by the boundary sector modifying module 612 and the registration number consideration module 613.

In the present embodiment, the output module 604 outputs population distribution information modified by the boundary sector modifying module 612 and the registration number consideration module 613, but it is not limited to this. For example, it is acceptable to omit modification performed by the boundary sector modifying module 612. It is also acceptable to omit modification performed by the registration number consideration module 613. Furthermore, it is acceptable to omit both modification performed by the boundary sector modifying module 612 and that performed by the registration number consideration module 613.

It goes without saying that the term "output" herein widely includes display output and print output. In other words, population distribution information may be display output on a display or the like, may be print output from a printer or the like, or may be output both in display and in print.

As for the output method, specifically, it is acceptable to express population distribution with colors by painting respective sectors with colors corresponding to the population distribution. It is also acceptable to write down numerals.

[Flow of Process performed in Communication System]

Figure 9:
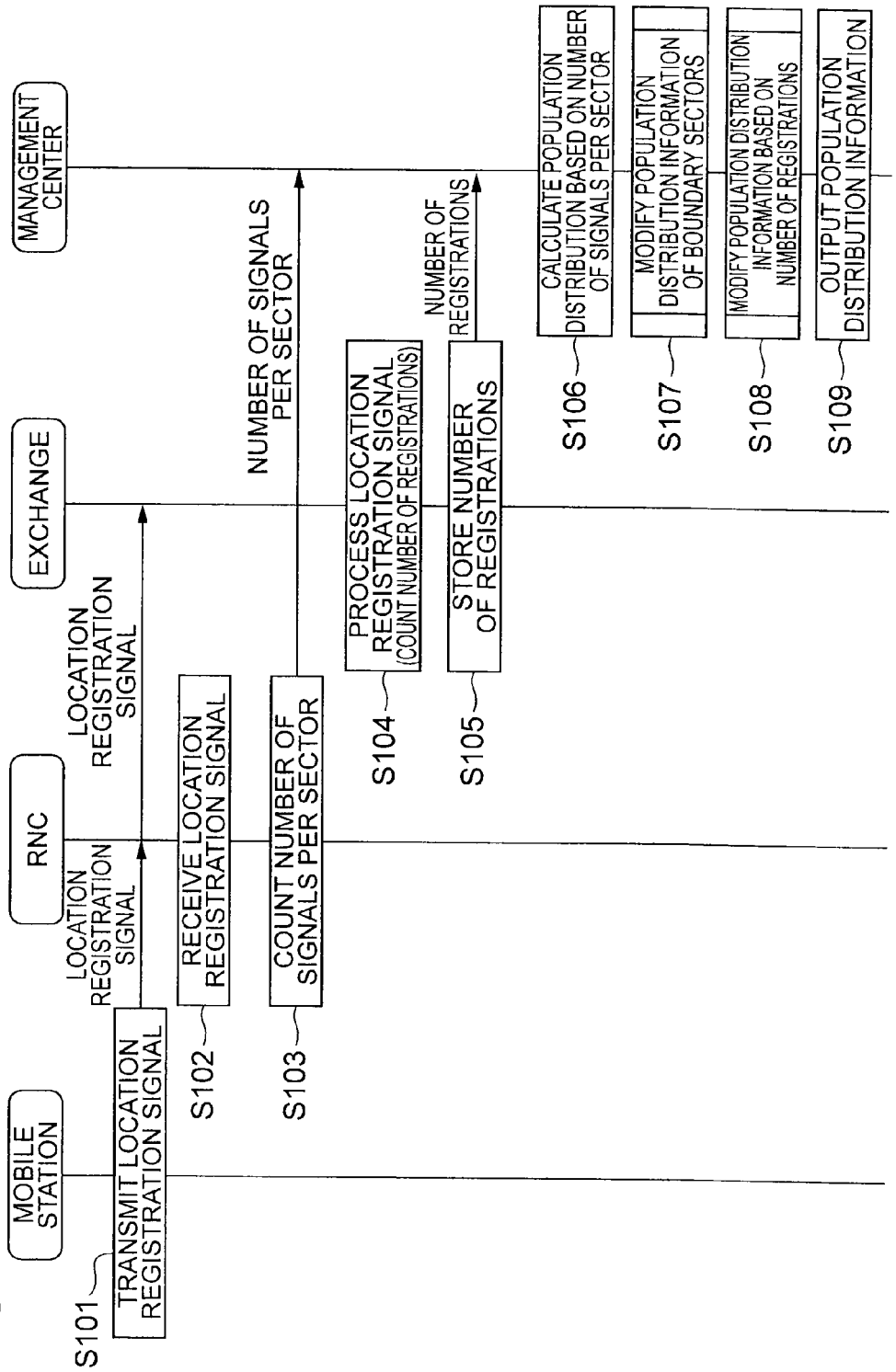
FIG. 9 is a diagram illustrating a flow of processes by the communication system depicted in FIG. 2.

A flow of processes of the communication system 10 thus structured will be described hereinafter referring to FIGS. 9 to 11.

The mobile station 100, when it moves across a boundary of location registration areas, and when a certain period has passed, transmits location registration signals (step S101).

The location registration signal receiver 303 of the RNC 300 receives the location registration signal that the mobile station 100 transmitted (step S102).

The signal number counting module 304 of the RNC 300 counts the number of signals per sector. The number of signals per sector thus counted is transmitted to the management center 500 at constant intervals or in response to a request from the management center 500 (step S103). The location registration signal processing module 404 of the exchange 400, based on the location registration signal that the mobile station 100 transmitted, counts the number of location registrations that is the number of mobile stations 100 registered in the location registration area (step S104).

The storage module 403 of the exchange 400 stores therein the number of location registrations that the location registration signal processing module 404 counted. The number of location registrations stored is transmitted at constant intervals or in response to a request from the management center 500 (step S105).

The population distribution calculation module 611 of the information analyzing apparatus 600, based on the numbers of signals per sector received from the RNC 300, calculates population distribution information (step S106).

The boundary sector modifying module 612 modifies, out of the population distribution information, the numbers of signals per sector regarding sectors lying at a boundary between the location registration areas (step S107).

The registration number consideration module 613 modifies the population distribution information based on the number of location registrations received from the exchange 400 (step S108).

The output module 604 outputs the population distribution information (step S109).

Figure 10:
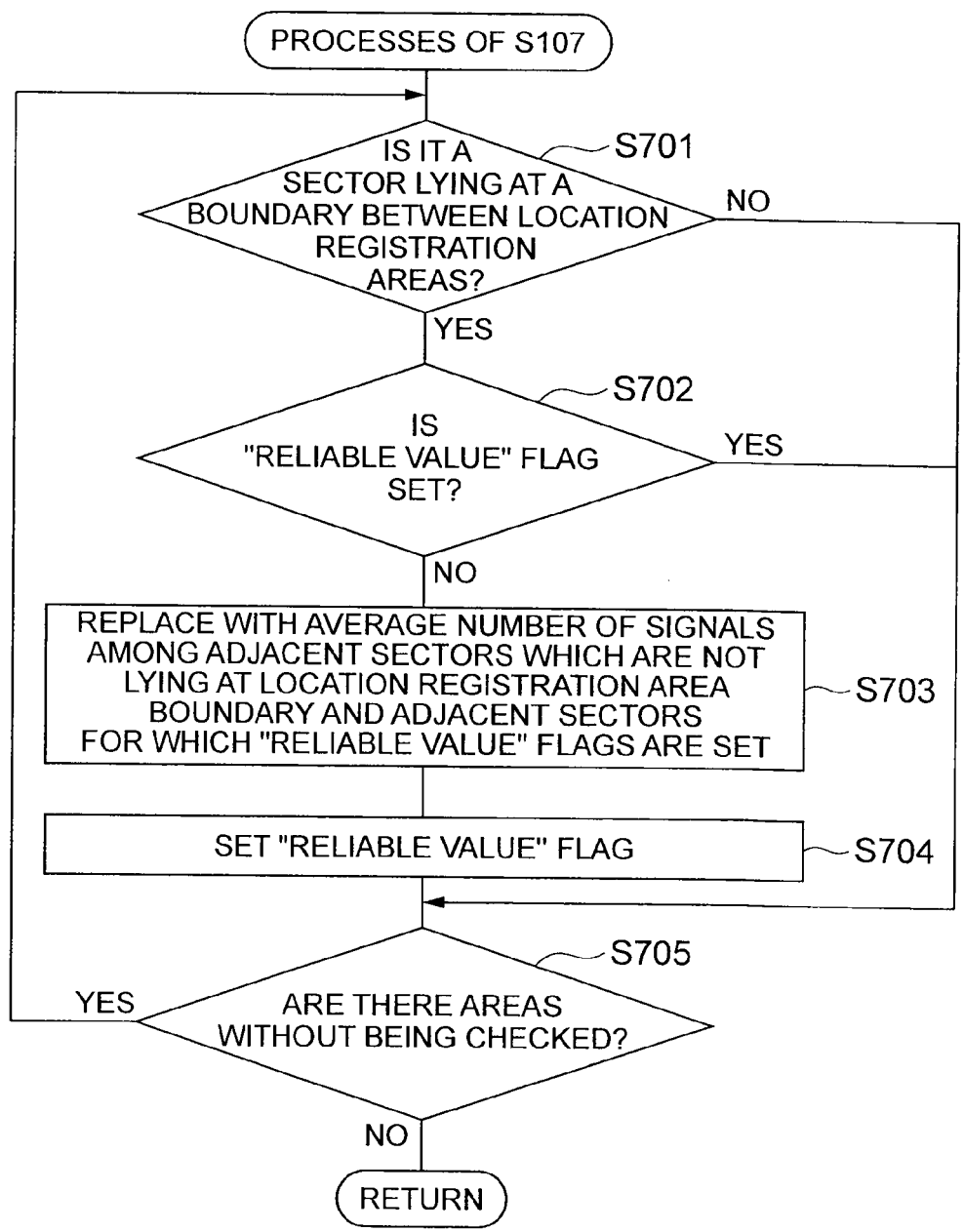
FIG. 10 is a diagram illustrating a flow of a modifying process on population distribution information of boundary sectors depicted in FIG. 9.

Referring to FIG. 10, a process of "modifying population distribution information for a boundary sector (step S107)" will be described hereinafter.

This process is applied only to the sectors lying at the boundary between the location registration areas (step S701). The boundary sector modifying module 612 selects, out of the sectors lying at the boundary between the location registration areas, one sector as a target (hereinafter, referred to as a "targeted sector").

The boundary sector modifying module 612 determines whether or not a "reliable value" flag is set for the targeted sector (step S702).

When the boundary sector modifying module 612 determines that a "reliable value" flag is set (YES at step S702), the boundary sector modifying module 612 performs a process at S705 described later.

When the boundary sector modifying module 612 determines that a "reliable value" flag is not set (NO at step S702), the boundary sector modifying module 612 selects, out of sectors adjacent to the targeted sector, sectors that are not lying at the boundary or to which a "reliable value" flag is set, and take the average of the number of signals per sector regarding the sectors thus selected.

Furthermore, the boundary sector modifying module 612 replaces the number of signals per sector of the targeted sector with the average taken above (step S703).

The boundary sector modifying module 612 sets a "reliable value" flag for the targeted sector (step S704).

The boundary sector modifying module 612 applies the processes from the above-described step S701 to step S704 to all sectors (step S705).

Figure 11:
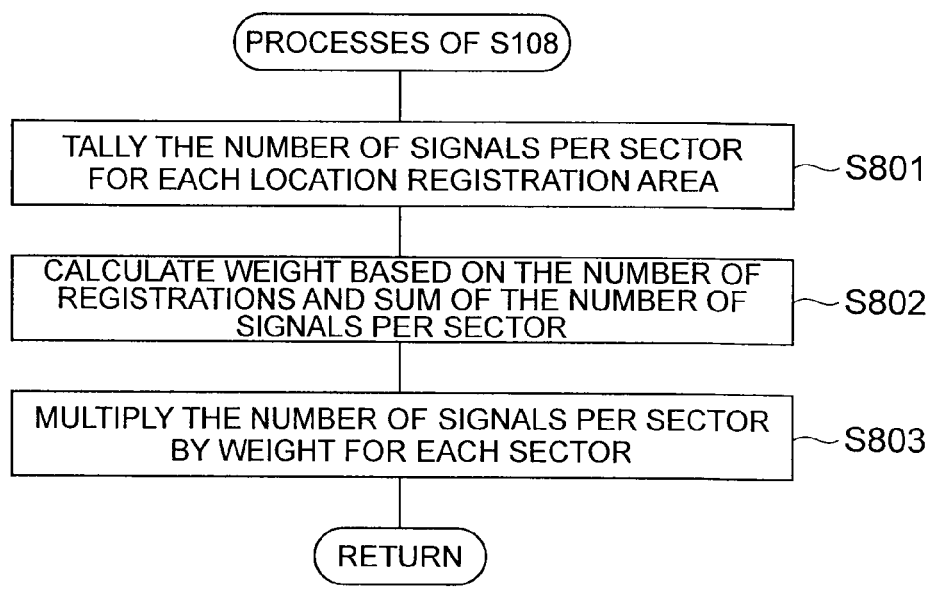
FIG. 11 is a diagram illustrating a flow of a population distribution information modifying process based on the number of location registrations depicted in FIG. 9.

Referring to FIG. 11, a process of "modifying the population distribution information based on the number of location registrations (step S108)" will be described hereinafter.

The registration number consideration module 613 tallies (sums up), for each location registration area, the numbers of signals per sector regarding all sectors constituting the location registration area (step S801).

The registration number consideration module 613 calculates a weight, by dividing the number of location registrations that is the number of mobile stations 100 registered in a location registration area by the sum of the numbers of signals per sector (step S802).

The registration number consideration module 613 multiplies each the number of signals per sector by the weight (step S803).

[Operation and Effect]

An operation and an effect of the communication system 10 of the present embodiment will be described hereinafter.

The RNC 300 of the communication system 10 of the present embodiment include the location registration signal receiver 303 that receives a location registration signal and the signal number counting module 304 that counts the number of signals of location registration signals for each sector. The information analyzing apparatus 600 includes the population distribution calculation module 611 that calculate population distribution information based on the number of signals per sector and the output module 604 that outputs the population distribution information. Accordingly, by easily and quickly collecting location registration signals that mobile stations 100 transmit and outputting population distribution information calculated based on this information, it is possible to easily and quickly obtain data survey results regarding macroscopic population distribution.

The information analyzing apparatus 600 further includes the boundary sector modifying module 612 that modifies information that is information included in population distribution information and corresponds to the number of signals regarding sectors lying at a boundary between location registration areas. Accordingly, it is possible to appropriately correct errors in the number of signals regarding sectors located at boundaries between location registration areas.

The communication system 10 is configured to further include the exchange 400 including the location registration signal processing module 404 that receives a location registration signal requesting location registration in a location registration area from a mobile station 100 and counts the number of location registrations that is the number of mobile stations 100 registered in the location registration area, and the information analyzing apparatus 600 further includes the registration number consideration module 613 modifying information that is information included in population distribution information and corresponds to the number of signals regarding sectors constituting the location registration area. For every location registration area, the information analyzing apparatus 600 grasps the quantity (the actual number) of mobile stations actually located in sectors, making it possible to calculate more realistic population distribution information by using the information grasped.

Second Embodiment

Figure 12:
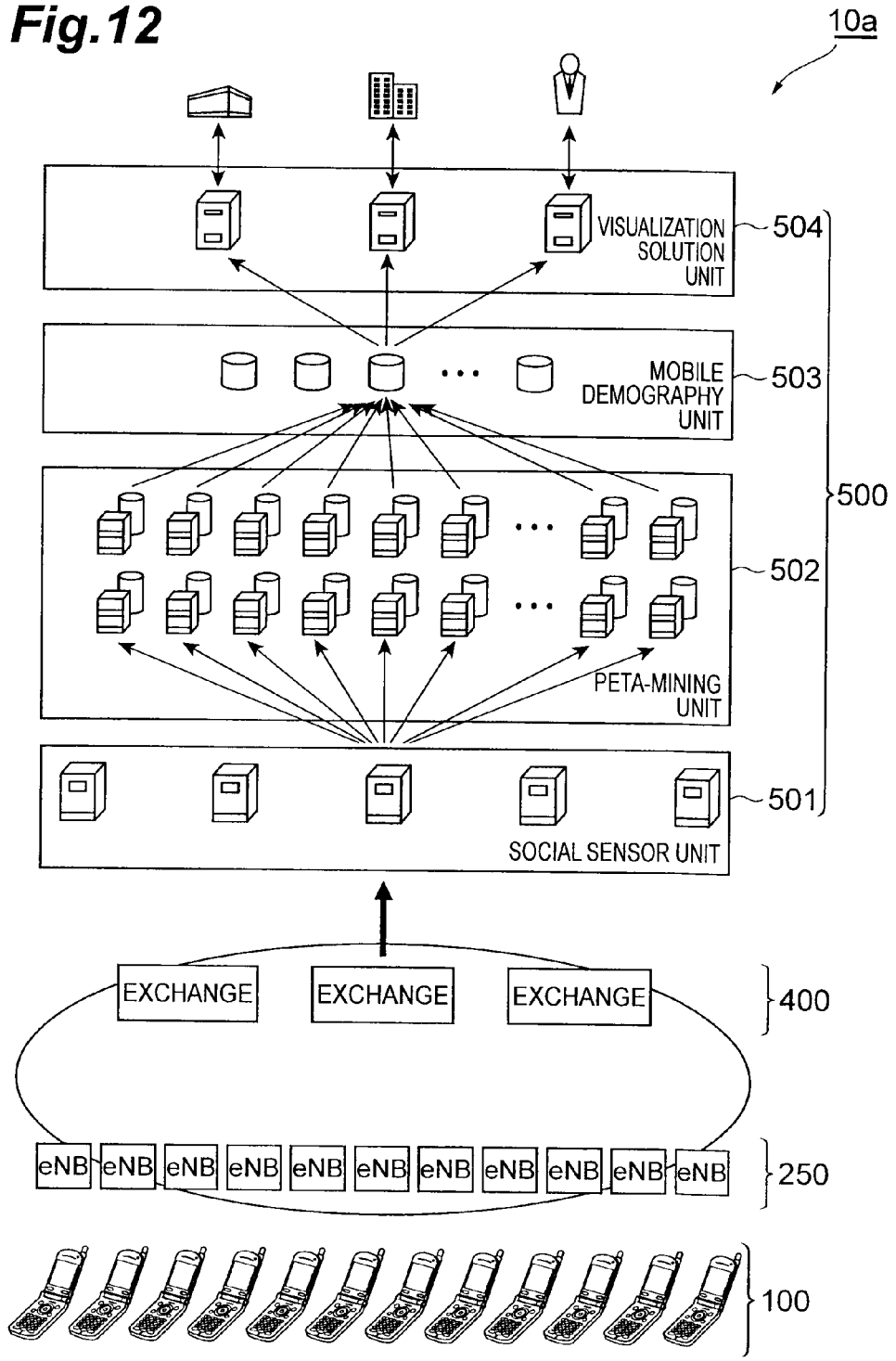
FIG. 12 is a diagram illustrating a system structure of a communication system according to a second embodiment of the present invention.

FIG. 12 is a system structure diagram of a communication system 10a according to a second embodiment of the present invention. As illustrated in FIG. 12, this communication system 10a has a system structure for the case of applying it to Long Term Evolution (LTE) that is a new communication standard, and is configured to include mobile stations 100, Evolution Node Bs (eNBs) 250, exchanges 400, and a management center 500. The management center 500 is configured with social sensor units 501, peta-mining units 502, mobile demography units 503, and visualization solution units 504. The eNB 250 includes both functions of the BTS 200 and the RNC 300.

The second embodiment is a system structure for the case of applying it to LTE and the contents of its specific processes are the same as those of the above-mentioned first embodiment, and accordingly its specific description is omitted. In the first embodiment, its protocol is Radio Access Network Application Part (RANAP). In the second embodiment, S1 Application Protocol (S1AP) used for LTE is used and, with respect to the Initial UE Message, the same signals are used for S1AP.

In the first embodiment and the second embodiment, descriptions are made assuming the third-generation cellular phone (3G) system, but these are applicable to Global System for Mobile Communications (GSM).

INDUSTRIAL APPLICABILITY

According to the present invention, it is possible to easily and quickly (in almost real time) collect data regarding macroscopic population distribution and obtain survey results.

REFERENCE SIGNS LIST

10, 10a . . . communication system, 100 . . . mobile station, 200 . . . BTS, 250 . . . eNB, 300 . . . RNC, 302 . . . RNC communication controller, 303 . . . location registration signal receiver, 304 . . . signal number counting module, 400 . . . exchange, 401 . . . exchange communication controller, 402 . . . converter, 403 . . . storage module, 404 . . . location registration signal processing module, 500 . . . management center, 502 . . . peta-mining unit, 503 . . . mobile demography unit, 504 . . . visualization solution unit, 600 . . . information analyzing apparatus, 601 . . . information analyzing apparatus communication controller, 604 . . . output module, 611 . . . population distribution counting module, 612 . . . boundary sector modifying module, 613 . . . registration number consideration module

The invention claimed is:

1. A communication system configured to comprise:
a base transceiver station that controls sectors constituting a location registration area that is a unit area for registering a location;
mobile stations located in the sectors;
a radio network controller that controls the base transceiver station;
an exchange; and
an information analyzing apparatus that is communicably connected with the radio network controller via the exchange, wherein the radio network controller comprises:
- a location registration signal receiver that receives location registration signals which are transmitted from the mobile stations and are signals requesting location registration in the location registration area; and
- a signal number counting module that counts the number of the location registration signals for each sector during a unit time, wherein the exchange comprises a location registration signal processing module that receives location registration signals requesting location registration in each location registration area from the mobile stations and, based on the location registration signals thus received, counts the number of location registrations that is the number of mobile stations registered in each location registration area, and wherein the information analyzing apparatus comprises:
- a population distribution calculation module that calculates population distribution information on population distribution that includes at least information corresponding to the number of the location registration signals, based on the number of the location registration signals;
- a registration number consideration module that modifies information included in the population distribution information and corresponding to the number of location registration signals for each sector constituting the location registration area, based on the number of location registrations; and
- an output module that outputs the population distribution information after the modification.

2. The communication system according to claim 1, wherein the information analyzing apparatus further comprises a boundary sector modifying module that modifies information that is included in the population distribution information and corresponds to the number of location registration signals regarding a sector located at a boundary between location registration areas.

3. An information analyzing apparatus communicably connected via an exchange with a radio network controller that controls a base transceiver station controlling sectors in which mobile stations are located, the sectors constituting a location registration area that is a unit area for registering a location, the communication analyzing apparatus comprising:
- a receiver that receives, from the radio network controller, the number of location registration signals per sector, the location registration signals being transmitted from the mobile stations and requesting location registration in the location registration area, and receives, from the exchange, the number of location registrations that is the number of mobile stations registered in each location registration area and that is counted based on the location registration signals by the exchange;
- a population distribution calculation module that calculates population distribution information on population distribution that includes at least information corresponding to the number of the location registration signals, based on the number of the location registration signals;
- a registration number consideration module that modifies information included in the population distribution information and corresponding to the number of location registration signals for each sector constituting the location registration area, based on the number of location registrations; and
- an output module that outputs the population distribution information after the modification.

4. An information analyzing method performed by a communication system configured to comprise: a base transceiver station that controls sectors constituting a location registration area being a unit area for registering a location; mobile stations located in the sectors; a radio network controller that controls the base transceiver station; an exchange; and an information analyzing apparatus that is communicably connected with the radio network controller via the exchange, the information analyzing method comprising:
- a location registration signal receiving step in which the radio network controller receives location registration signals which are transmitted from the mobile stations and are signals requesting location registration in the location registration area;
- a signal number counting step in which the radio network controller counts the number of the location registration signals for each sector during a unit time;
- a location registration signal processing step in which the exchange receives location registration signals requesting location registration in each location registration area from the mobile stations and, based on the location registration signals thus received, counts the number of location registrations that is the number of mobile stations registered in each location registration area;
- a population distribution calculating step in which the information analyzing apparatus calculates population distribution information on population distribution that includes at least information corresponding to the number of the location registration signals, based on the number of the location registration signals;
- a registration number consideration step in which the information analyzing apparatus modifies information included in the population distribution information and corresponding to the number of location registration signals for each sector constituting the location registration area, based on the number of location registrations; and
- an outputting step in which the information analyzing apparatus outputs the population distribution information after the modification.

\* \* \* \* \*